UNITED STATES PATENT OFFICE.

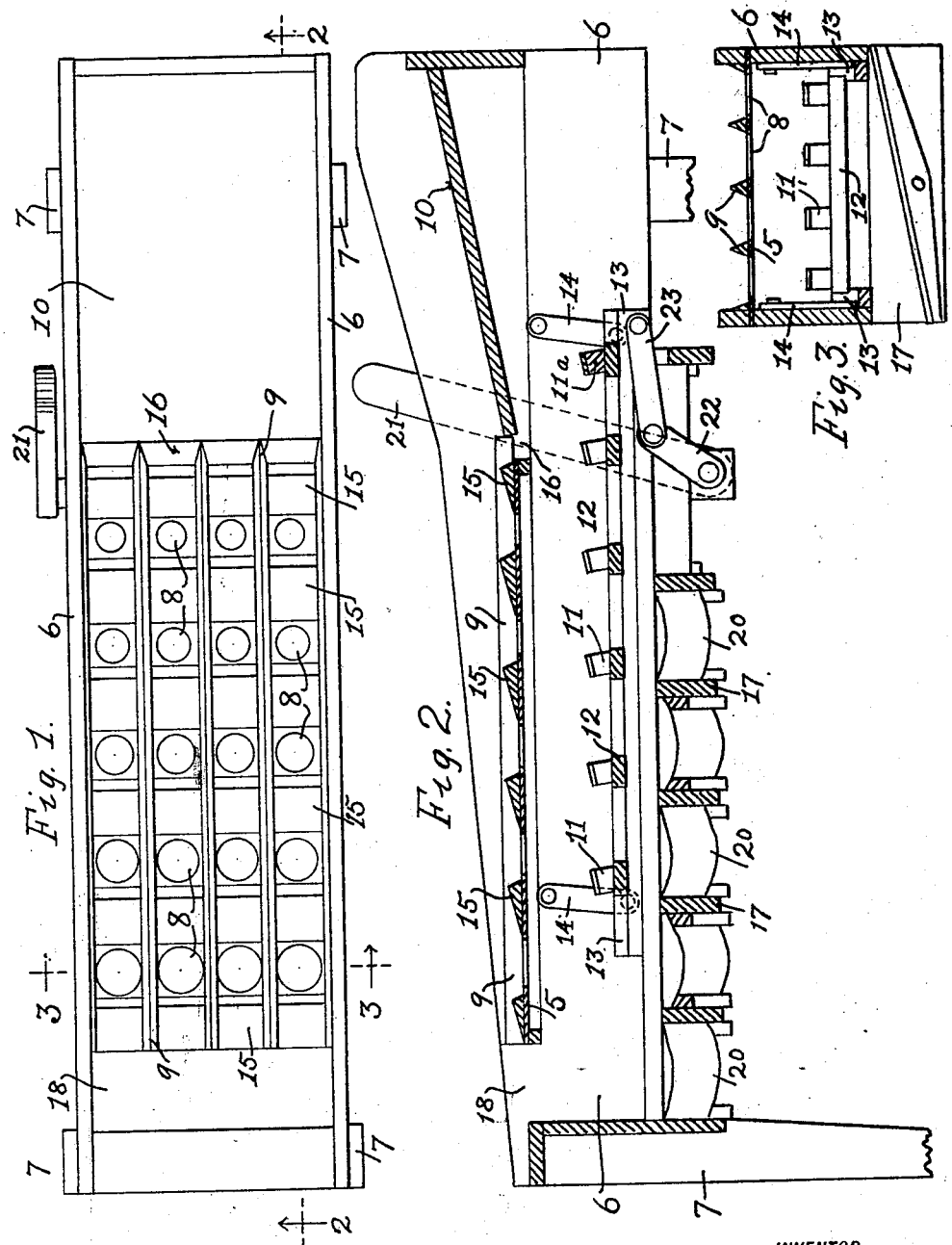

COMMODORE PERRY WELLER, OF CLIFTON, COLORADO.

FRUIT-GRADER.

1,197,697.  Specification of Letters Patent. Patented Sept. 12, 1916.

Application filed October 17, 1914. Serial No. 867,168.

*To all whom it may concern:*

Be it known that I, COMMODORE PERRY WELLER, a citizen of the United States, residing at Clifton, in the county of Mesa and State of Colorado, have invented a new and useful Improvement in Fruit-Graders, of which the following is a specification.

My invention relates to improvements in machines for grading or sizing fruit; and the object of the invention is to provide a machine of simple and compact construction which will sort the fruit accurately to size and discharge fruit of the same diameter into separate boxes or bins from which it may be rapidly packed into boxes or other receptacles. I attain this object by means of the mechanism shown in the accompanying sheet of drawings, in which—

Figure 1 is a plan view of the machine seen from above, Fig. 2 is a longitudinal sectional view of the machine on the line 2, 2, of Fig. 1; Fig. 3 is a cross sectional view on the line 3, 3, of Fig. 1.

Similar reference characters refer to similar parts in all of the views.

The sizing screen 5 is removably secured to a suitable frame, 6, in substantially a horizontal position, the frame being supported at a suitable height by legs, 7. The sizing openings, 8, in the screen, 5, are arranged in a series of longitudinal rows, the size of the openings increasing progressively from the supply end to the discharge end of the machine.

Each longitudinal row of the sizing openings has suitable guiding ribs, 9, which serve to guide the fruit centrally along the series of openings. Four longitudinal rows of the sizing openings are shown in the present machine, but it will be evident that the capacity of the machine may be increased to to any extent desired by increasing the width of the machine and providing additional longitudinal rows of the sizing openings.

An inclined fruit supply chute, 10, is provided at the supply end of the machine, into which the fruit to be sorted or sized is placed.

In order that the fruit may be caused to advance from opening to opening until it reaches one sufficiently large to permit it to drop through, means are provided for lifting and dislodging all fruit resting in openings which are too small to allow it to drop through, and then causing it to move on to an opening of larger diameter.

In order to lift and dislodge all fruit on the screen simultaneously, a series of buffers, 11, are provided, which correspond in number and relative position with the sizing openings. These buffers are secured to cross bars, 12, which are attached to a rectangular frame, 13, which is suspended from the main frame of the machine by pivoted arms, 14. The pivoted arms, 14, are so arranged and connected that a movement of the rectangular frame toward the discharge end of the machine will cause the buffers to describe an arc of the proper radius and enter the sizing openings a sufficient distance to lift up and dislodge any fruit therein. In the normal position of the rectangular frame and cross bars shown they are withdrawn entirely to one side of the sizing openings, thereby allowing the fruit to drop freely without striking them.

In order that all fruit when lifted from the sizing openings may be caused to move forward to an opening of a larger size, a series of inclined stops, 15, are provided between the successive openings. The buffers, 11, lift the fruit sufficiently high for it to roll freely down the inclined stops to the next larger opening. The operation of lifting and dislodging the fruit is repeated until the fruit reaches a hole sufficiently large to allow it to drop through, or until it reaches the end of the screen and drops into the rectangular opening, 18.

A slotted opening, 16, extending the entire width of the machine, is provided between the lower end of the supply chute, 10, and the supply end of the sizing screen, through which leaves, trash or under-sized fruit may drop into a cull box placed beneath. A longitudinal buffer, 11ª, is secured to the rectangular frame, 13, and serves to lift the fruit sufficiently high to roll down the first transverse row of inclined stops to the first row of sizing openings, 8.

Canvas-bottomed delivery chutes, 20, are provided, one beneath each cross row of sizing openings of the same size, into which all fruit of equal size drops. These delivery chutes are pivoted at their central part to cross members, 17, of the main frame, so they may be inclined to deliver the fruit to either side of the machine desired. The first row of sizing openings are of a size to sort out all fruit too small for packing, which is allowed to drop directly down into a box, placed under the machine.

The machine shown is designed for sorting the fruit into four regular sizes, and all fruit over size will drop off the end of the sizing screen through the rectangular opening, 18, into the last delivery chute, 20.

It will be evident that the machine may be designed to sort the fruit into any desired number of sizes by suitably varying the number and progressive variation in diameter of the sizing openings, 8.

What I claim as my invention is:

1. In a machine for sizing and grading fruit, the combination of a horizontal sizing screen provided with a series of sizing openings arranged in longitudinal rows increasing progressively in diameter, a series of inclined stops located between each of the sizing openings, parallel guide walls extending longitudinally between the rows of sizing openings, and means for dislodging fruit from the openings and lifting it sufficiently high to cause it to roll down the inclined stop to an opening of larger diameter.

2. In a machine for sizing and grading fruit, the combination of a horizontal sizing screen provided with a series of sizing openings arranged in longitudinal rows increasing progressively in diameter, a series of inclined stops located between each of the sizing openings, parallel guide walls extending longitudinally between the rows of sizing openings, a series of lifting buffers secured to a frame pivotally suspended below the sizing screen, and means for communicating a suitable reciprocating movement to the pivotally suspended frame.

3. In a machine for sizing and grading fruit, the combination of a horizontal sizing screen provided with a series of sizing openings arranged in longitudinal rows increasing progressively in diameter, a series of inclined stops located between each of the sizing openings, a rectangular frame suspended below and parallel to the sizing screen, buffers secured to the rectangular frame and suitably spaced to register with the sizing openings in the sizing screen, and means for communicating a suitable reciprocating movement to the frame and attached buffers.

C. PERRY WELLER.

Witnesses:
WILLIAM H. HAUN,
JAMES K. MCCLINTOCK.

Copies of this patent may be obtained for five cents each, by addressing the "Commissioner of Patents, Washington, D. C."